United States Patent [19]

Stoeckner

[11] Patent Number: 5,253,000
[45] Date of Patent: Oct. 12, 1993

[54] DEVICE FOR PROJECTING A MOVING IMAGE FORMED OF LIGHT, SHADOW, AND COLOR

[76] Inventor: Ursula Stoeckner, P.O. Box 2042, Seabrook, N.H. 03874

[21] Appl. No.: 738,871

[22] Filed: Aug. 1, 1991

[51] Int. Cl.$^5$ .............................................. G03B 21/00
[52] U.S. Cl. ........................................ 353/46; 353/62; 353/84; 353/87
[58] Field of Search .................. 353/46, 50, 51, 28, 353/62, 79, 80, 84, 97, 122, 98, 87, 85, 48, 49, DIG. 2, DIG. 3; 434/76, 284, 285, 290; 446/3, 485

[56] References Cited

U.S. PATENT DOCUMENTS

| | | | |
|---|---|---|---|
| 3,215,033 | 11/1965 | VanGelder | 353/51 |
| 3,359,855 | 12/1967 | Webb | 353/48 |
| 3,767,299 | 10/1973 | Fisher | 353/46 |
| 4,102,734 | 7/1978 | Schiffman | 353/50 |
| 4,192,584 | 3/1980 | Dougherty | 353/48 |
| 4,846,570 | 7/1989 | Kanai | 353/DIG. 3 |
| 4,910,541 | 3/1990 | Morgan | 353/62 |
| 4,917,487 | 4/1990 | Cruickshark | 353/46 |

*Primary Examiner*—William A. Cuchlinski, Jr.
*Assistant Examiner*—William C. Dowling
*Attorney, Agent, or Firm*—Lahive & Cockfield

[57] ABSTRACT

A device for simulating an image formed of light and shadow created by sunlight over a period of time includes a mask having a substantially opaque portion and a light source for shining light through the mask. The image moves to realistically simulate the effect created by the sun shining into a room through an exterior window. In one embodiment, the device includes a filter bearing a translucent color gradient so that the light defining the created shadow has a changing hue.

14 Claims, 6 Drawing Sheets

DEVICE FOR PROJECTING A MOVING IMAGE FORMED OF LIGHT, SHADOW, AND COLOR

BACKGROUND OF THE INVENTION

It is well known that human beings generally react positively to sunlight. Individuals deprived of exposure to sunlight can become depressed, apathetic, and sometimes, even physically ill. Unfortunately, however, many people maintain lifestyles, either voluntarily or otherwise, that restrict their exposure to natural sunlight.

Hospital patients and nursing home residents, for example, are often inadequately exposed to natural sunlight. Due to insufficient housing space of this nature, it is often necessary to place hospital patients and nursing home residents in windowless rooms. Because people so situated are often not ambulatory, they can be deprived of exposure to sunlight for extended periods of time resulting in the above stated problems.

Additionally, due to the lack of natural sunrise at their waking hour, night workers often experience difficulty waking up at night to begin work.

It is, therefore, an object of the present invention to provide a device for relieving the problems experienced by individuals who experience insufficient exposure to natural sunlight. It is another object of the invention to provide a device which simulates in a confined space light and shadows created by natural sunlight shining through an exterior window.

SUMMARY OF THE INVENTION

These and other objects are achieved by the present invention which features a device for simulating in a windowless interior space the effect caused in a windowed interior space by the natural rise of the sun. In one embodiment, the device includes a mask and an optics system for directing light through the mask to project a shadow of the mask into a room. The mask typically represents a window sash and mullions so that the shadow created by the invention simulates the shadow cast on an interior wall by the rising sun shining through a window on an outside wall.

The inventive device includes mechanical structure for moving the optics system and/or the mask to create a dynamic shadow such as that created by the moving sun. This can include structure for moving the mask, the optics system, or a combination of both. The device includes timing circuitry so that the light and shadow activation period and cycle can be programmed for a selected duration and interval.

In one embodiment, the invention features a filter bearing a translucent color gradient passing from, for example, dark red/orange through bright yellow/white. The filter is arranged so that light generated by the optics system passes through the mask and the filter. As a result, light defining the projected shadow has a hue which changes as the shadow moves through the interior space. This feature enables this embodiment of the invention to more realistically simulate the light and shadow created initially by sunrise and thereafter at successive hours of the day.

These and other features of the invention will be more fully appreciated by reference to the following detailed description in conjunction with the attached drawing.

DETAILED DESCRIPTION OF ILLUSTRATED EMBODIMENTS

In its broadest aspects, the invention features a device for simulating in a windowless interior space, the effect on an interior wall created by sunlight shining through a window on an exterior wall. The device includes an optics system for shining light through a mask having a substantially opaque framework depicting, for example, a standard window sash and mullion arrangement. Mechanics are provided for moving the mask and/or the optics system so that the shadow created thereby moves similarly to the movement of naturally created shadows. This may or may not include altering the positions of the mask and optics system relative to one another.

Figure 1:
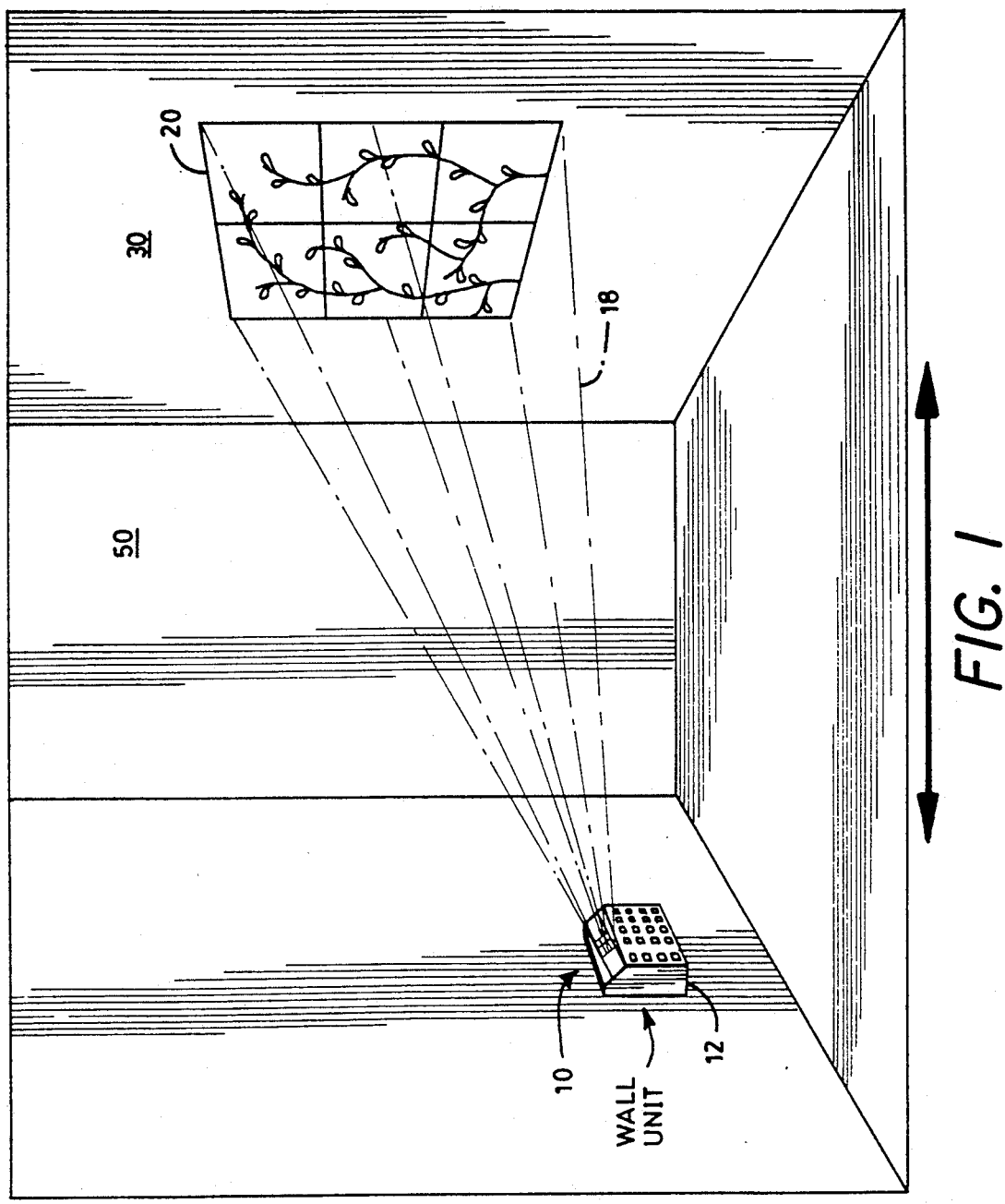
FIG. 1 is a schematic depiction of a device constructed in accordance with the teachings of the present invention, the device being shown in operation in an interior space.

FIG. 1 schematically shows the effect created by the device 10 in a room 50. In the figure, the device 10 is powered by a wall outlet (not shown). The device 10 can also be constructed to be battery powerable depending on the required application. If battery driven, the battery may or may not be rechargeable.

Figure 2:
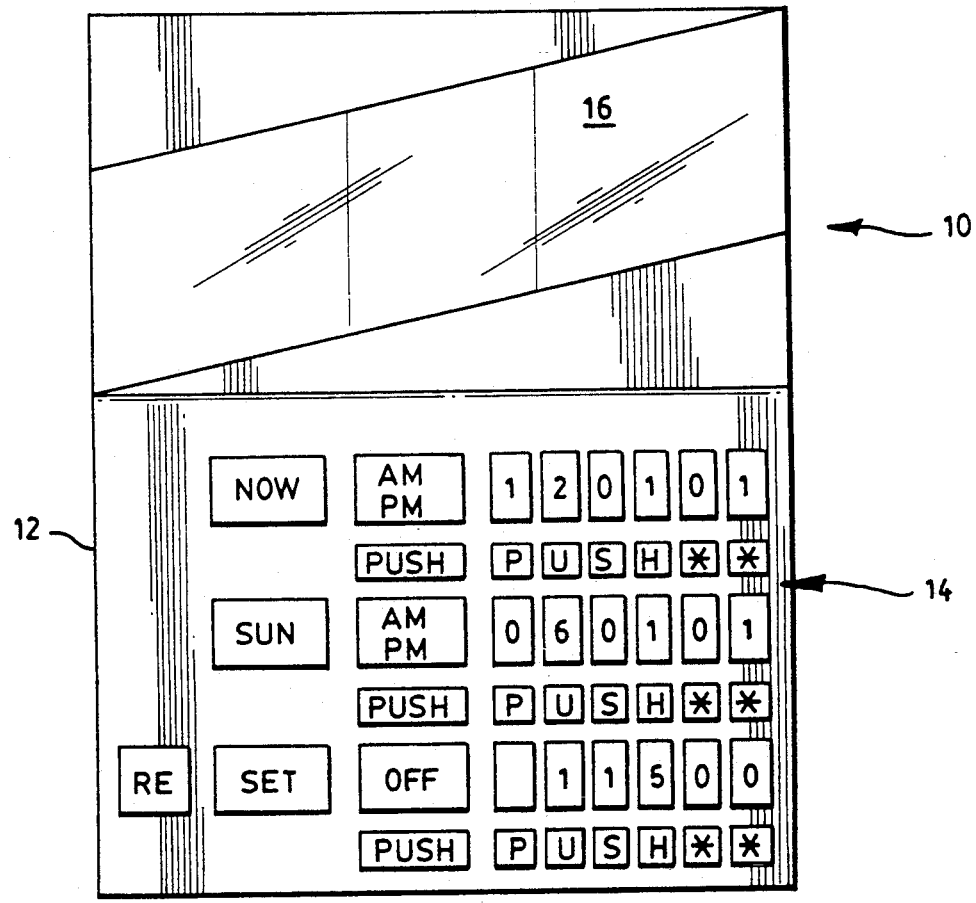
FIG. 2 is an enlarged schematic view of the device shown in FIG. 1.

The device 10, shown more clearly in FIG. 2, includes a projector forming a housing 12 the front of which is provided with a control panel 14. Above the control panel 14 is an opening 16 through which light generated within the housing 12 is able to pass. The sides of the housing 10 are substantially opaque so that light generated within the housing is confined therein except for that portion of the light which is projected through the opening 16. The projection of light through the window 16 is represented in FIG. 1 by dashed lines 18. The device 10 projects a shadow 20 on a wall 30 of the room 50.

Figure 3:
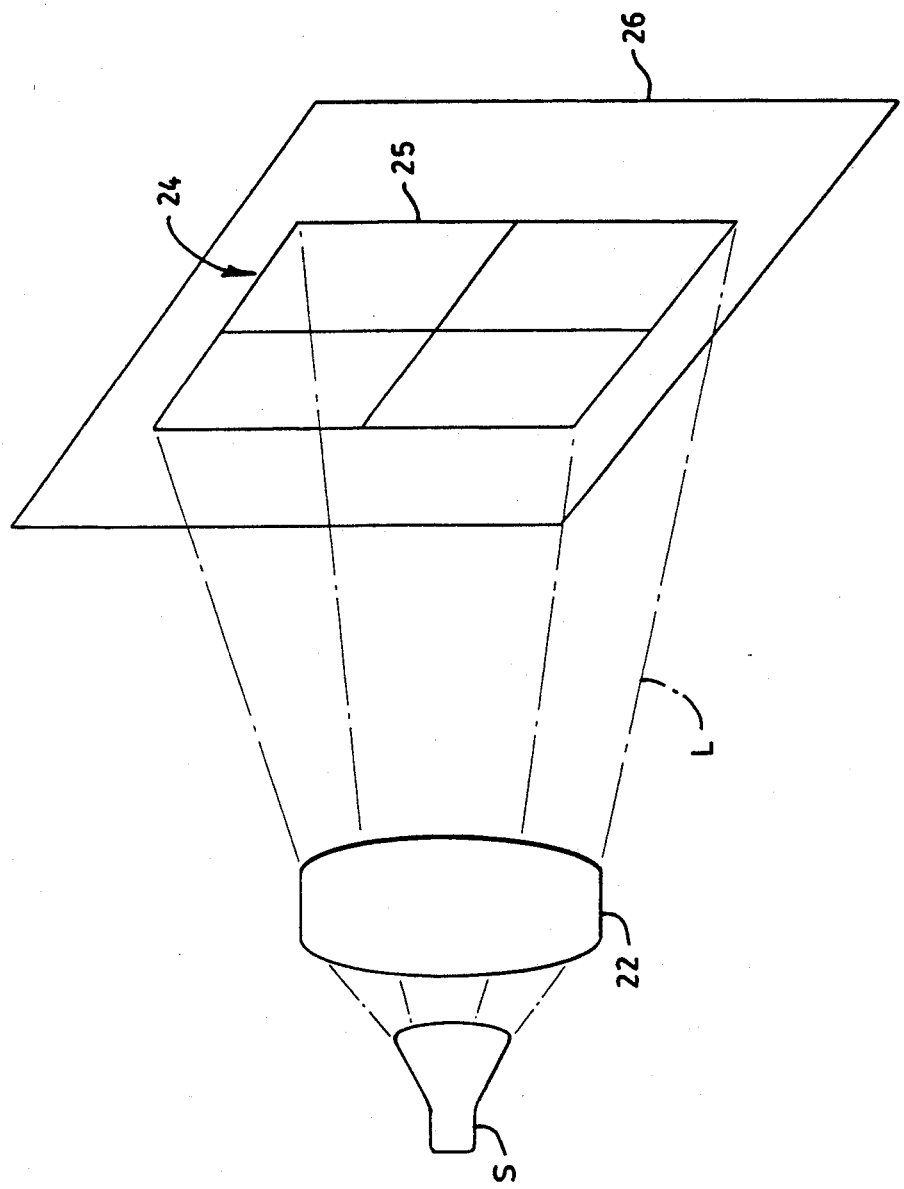
FIG. 3 is a schematic view of some of the components of the interior of the device shown in FIG. 2.

As shown in FIG. 3, the shadow 20 is created by light, represented by dashed lines L, which is generated by a light source S and passes through a mask 24. Specifically, the shadow 20 is created by the substantially opaque portions 25 of the mask. As illustrated, the opaque portions 25 typically form on wall 30 an image representing a window sash and mullion arrangement creating the same effect as a shadow cast on that wall by sunlight shining through an exterior window. Additionally, the opaque portions can form peripheral features such as tree limbs and the like.

In some embodiments of the invention, the light L is focussed by a lens such as the illustrated double convex lens 22 or other standard projector type lens system. A lens may or may not be necessary depending on the selected light source L. As long as the generated light passes through the mask 24 and creates a discernible shadow such as shadow 20 the unit will perform satisfactorily. It is also required that, if generated, stray light emanating from the light source be contained. A twelve volt, seventy-five watt M82 style light bulb is considered suitable for use with the present invention. When such a light bulb is used, it is preferable to use a double convex positive lens.

To further enable the device 10 to realistically simulate the effect created by the rising sun shining through a window, the device 10 preferably includes a filter 26 bearing a translucent color gradient. The color gradient passes from, for example, dark red/orange through bright yellow/white so that the light projected by the device creating the shadow 20 has a hue resembling that of natural light created by sunrise.

Figure 4:
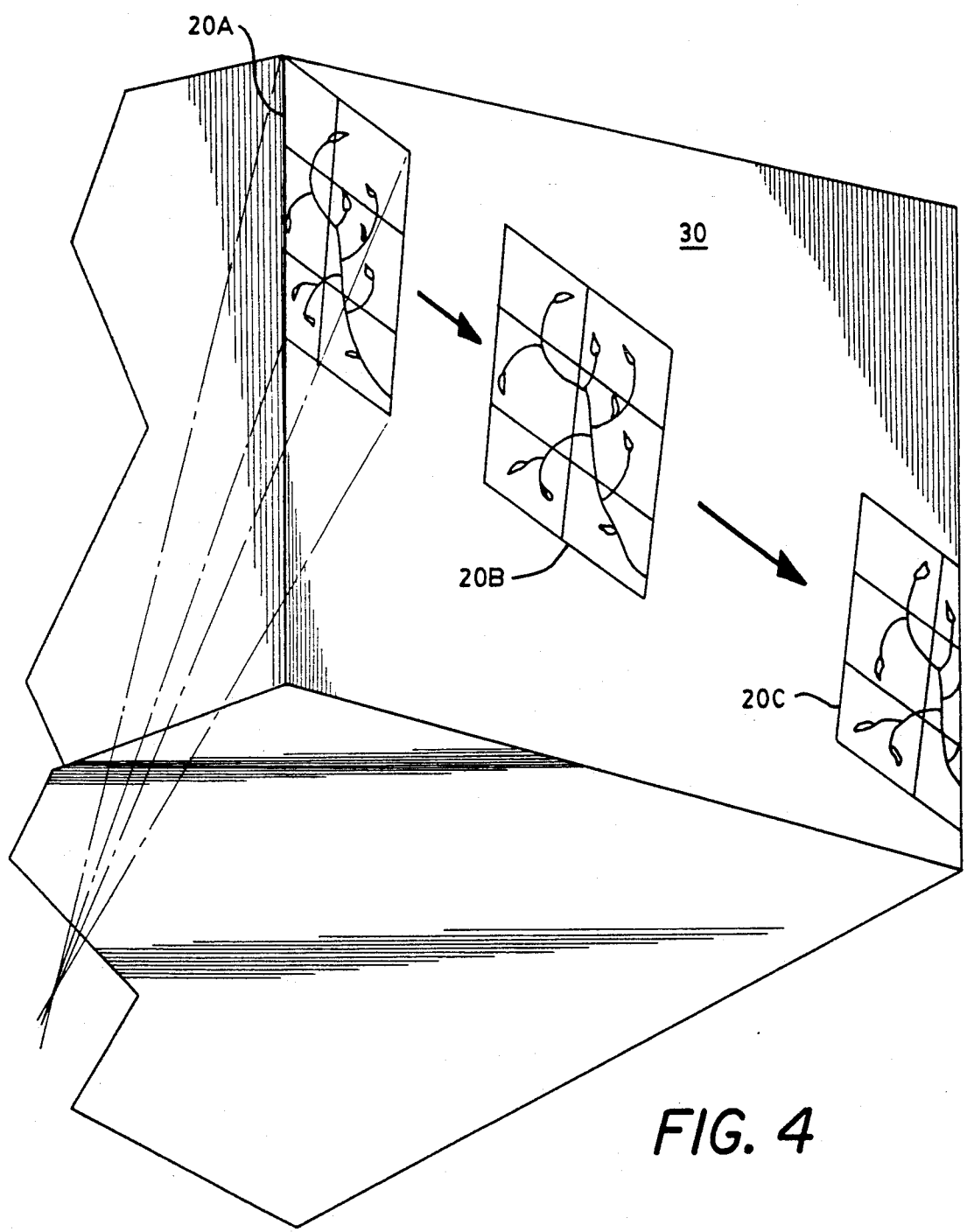
FIG. 4 is a schematic depiction of the effect created by the device shown in FIG. 2.

FIG. 4 shows the effect created by the inventive device over a period of time such as, for example, between a half hour and an hour and a half. In the figure, a partial shadow 20A appears on a wall 30 to the upper left representing the effect created when the device 10 is first activated. In embodiments of the invention including filter 26, shadow 20A will be defined by light, for example, having a dark red/orange hue. Slowly, the shadow moves downwardly and laterally, like window-shadows created by sunrise, until the full shadow 20B is generated. Eventually, the partial shadow 20C is generated at the end of the device's activation cycle. Again, if filter 26 is present, light defining shadow 20C will have a bright yellow/white hue. In this manner, the device 10 simulates, in a windowless interior space, the effect created by the sun in a windowed interior space during and after sunrise.

Standard electrical circuitry and mechanical structure such as are generally known in the art of time related movement are suitable for moving the light source S and the mask 24. For example, standard clockworks can be adapted with conventional linkages for moving either the light source S or the mask 24, or a combination of both, so that the shadow effect created by the device 10 is dynamic like that generated by natural sunlight.

Figure 5C:
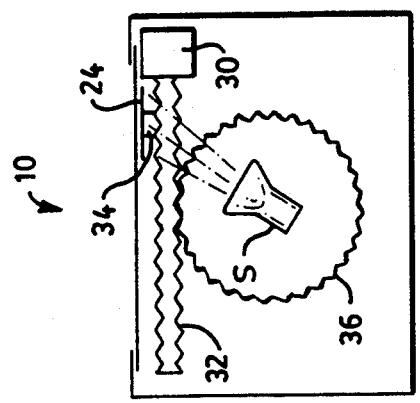
FIGS. 5A through 5C schematically depict an embodiment of the driving structure, in different positions, of the device shown in FIG. 2.
Figure 5B:
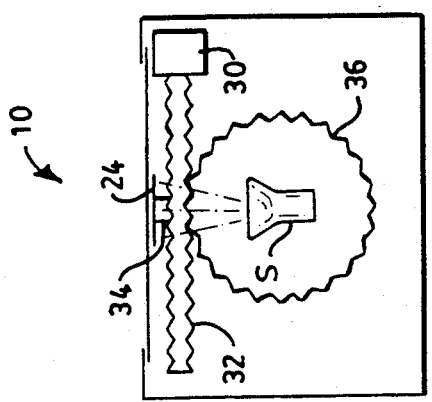
Figure 5A:
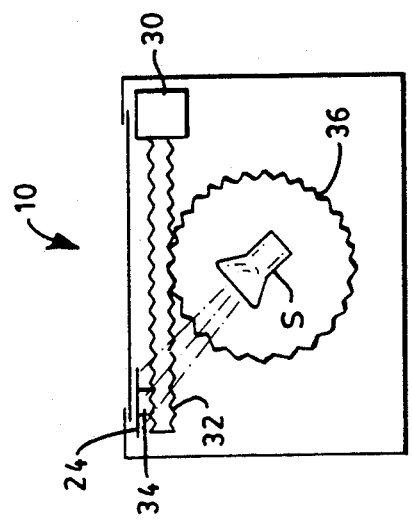

For example, FIGS. 5A through 5C schematically show structure for moving the light source L and the mask 24 to create an image that will move to simulate shadows created by sunlight. In the illustrated embodiment, a driver 30, which can be programmed via control panel 14, rotates a worm gear 32 which engages both a carrier 34 and a gear 36. The mask 24 is mounted on the carrier 34 and the light source L is mounted on the gear 36 so that as the driver 30 rotates the worm gear 32, the light source L rotates as the carrier 34 travels linearly. The rate at which the driver 30 rotates the worm gear 32, the threads on the worm gear 32, and the configuration of the gear 36, can all be determined in a manner generally known in the art to result in the light source L following the mask 24 to create a moving shadow simulating a shadow created by natural sunlight. In embodiments of the invention including filter 26, the filter will typically remain stationary so that as the mask 24 and light source S move, light passing through the mask will pass through different portions of the filter color gradient. Additionally, while a worm gear driving structure is illustrated, other mechanics such as various tracking and linkage arrangements are capable of achieving the desired effect and will be apparent to those skilled in the art.

Figure 6:
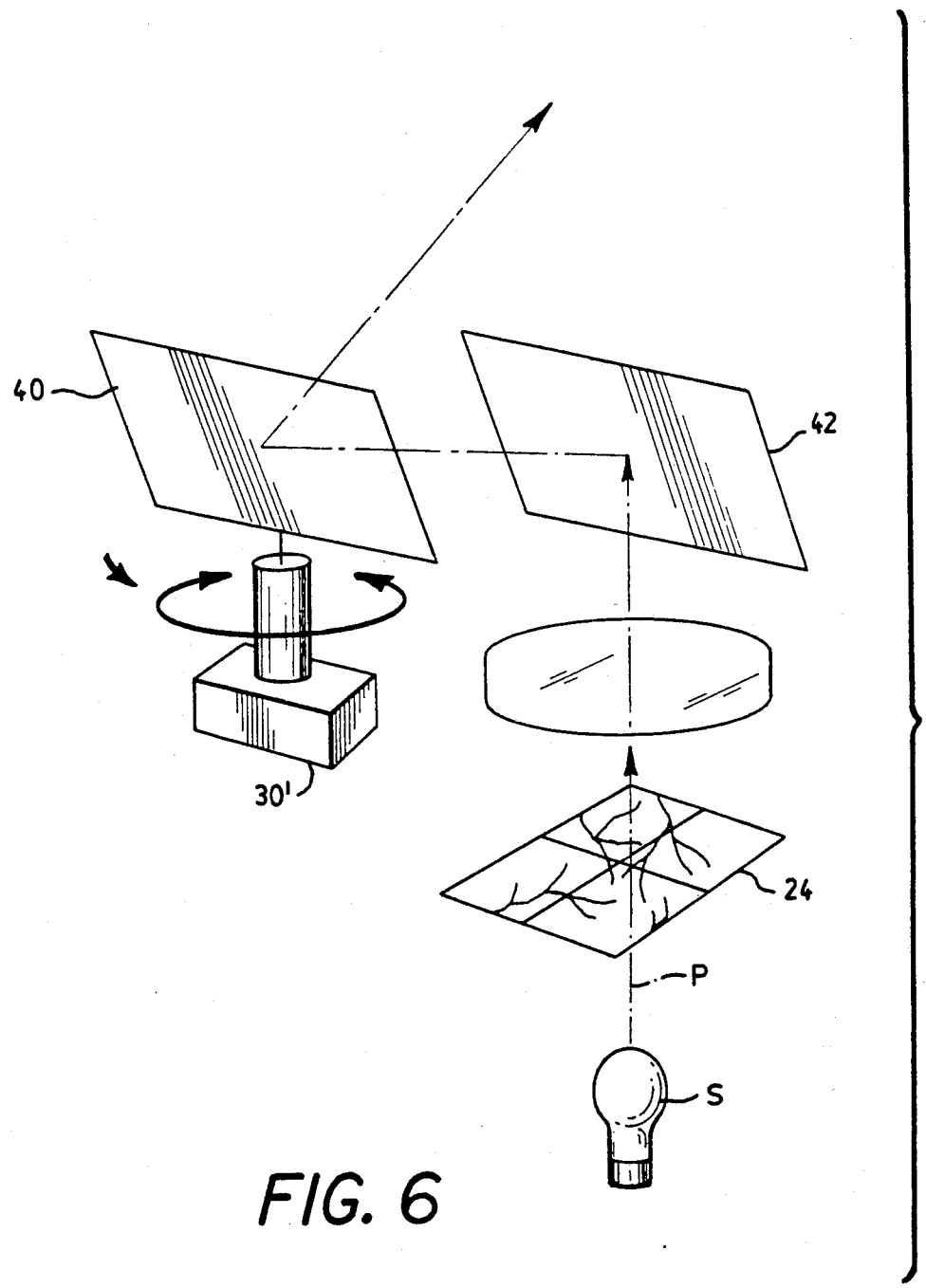
FIG. 6 schematically depicts another embodiment of the driving structure of the device shown in FIG. 2.

It may also be desirable, as schematically shown in FIG. 6, to leave the light source S and mask 24 stationary and create the dynamic image by utilizing a rotating mirror 40. In this embodiment of the invention, light from the source S travels along a path P and reflects off of a stationary mirror 42 and the rotatable mirror 40. A driver 30' is controlled by electric circuitry as described above and rotates the mirror 40 to direct the reflected light to create the desired effect.

In operation, the device 10 will typically be programmed by the user to have an activation period of between one half, and one and one half hours, over a twenty-four hour cycle. The user programs the device via control panel 14 which is connected to the device's driver as well as to the light source S power supply. For various applications, other activation periods may be desirable. Known electronic control circuitry, such as is utilized for programming video cassette recorders, is suitable for use in conjunction with the invention.

In use, therefore, the device 10 is typically programmed to turn on daily around the time of natural sunrise. Other activation times, however, such as for night workers, may be desirable. In any case, the device 10 remains activated for a selected time period, for example one hour, during which it projects a shadow image which moves and changes hue similarly to the image created on an interior wall by the rising sun shining through a window in an exterior wall. At the end of the activation cycle power to the light source S is shut off and the driving structure returns the mask 24 and light source S to their original positions.

In certain applications it may be desirable to have one electronic control unit control several devices. In this embodiment of the invention the single electronic control unit can be utilized to activate multiple units throughout, for example, a nursing home so that a sunrise effect is generated in multiple rooms simultaneously.

It should be understood that while specific embodiments of the invention have been described in detail, various alterations which are intended to be embraced within the spirit and scope of the invention will be apparent to those skilled in the art. The invention is to be defined, therefore, not by the preceeding description but by the claims that follow.

What is claimed is:

1. A device for simulating an image formed of light, color and shadow and cast on an interior surface by sunlight shining through an exterior window, the device comprising
   a mask having a substantially opaque portion,
   means for shining light through said mask to generate a discernible shadow corresponding to said substantially opaque portion, the light and shadow forming the image
   means for moving the image as if it were created by natural sunlight over a period of time, and
   a filter bearing a translucent color gradient and arranged so that the light passing through said mask also passes through said filter.

2. A device as set forth in claim 1, wherein said means for moving the image comprises means for synchronously moving said mask and said means for shining light through said mask.

3. A device as set forth in claim 1, wherein said means for moving the image comprises means for moving said mask.

4. A device as set forth in claim 1, wherein said means for moving the image comprises means for moving said means for shining light through said mask.

5. A device as set forth in claim 1, wherein said means for moving said image comprises a rotatable mirror.

6. A device as set forth in claim 1, wherein said means for shining light through said mask includes a light source and a focussing lens.

7. A device as set forth in claim 1 wherein said substantially opaque portion of said mask depicts a window sash and mullion arrangement.

8. A device as set forth in claim 7 wherein said substantially opaque portion of said mask additionally depicts objects external to said window sash whose cast shadow falls within the shadow framework of said window sash and mullion arrangement.

9. A device as set forth in claim 8 wherein said objects are trees.

10. A device as set forth in claim 1 wherein said means for moving said mask and said means for shining light through said mask alters the positions of said mask and said means for shining light through said mask relative to one another.

11. A device for simulating an image formed of light and shadow and cast on an interior surface by sunlight shining through an exterior window, the device comprising a mask having a substantially opaque portion, means for shining light through said mask to generate a discernible shadow corresponding to said substantially opaque portion, the light and shadow forming the image, and means for moving the image as if it were created by natural sunlight over a period of time, wherein said means for moving comprises means for moving said mask synchronously with, and in the same direction as, said means for shining light through said mask, wherein said means for shining light through said mask includes a light source and a focusing lens, and wherein said substantially opaque portion of said mask depicts a window sash and mullion arrangement.

12. A device as set forth in claim 11, wherein said substantially opaque portion of said mask additionally depicts objects external to said window sash whose cast shadow falls within the shadow framework of said window sash and mullion arrangement.

13. A device as set forth in claim 12, wherein said objects are trees.

14. A device as set forth in claim 11 further comprising a filter bearing a translucent color gradient and arranged so that the light passing through said mask also passes through said filter.

* * * * *